Feb. 26, 1957     D. H. BOND     2,782,804
PIPE SPACING DEVICE
Filed May 27, 1953
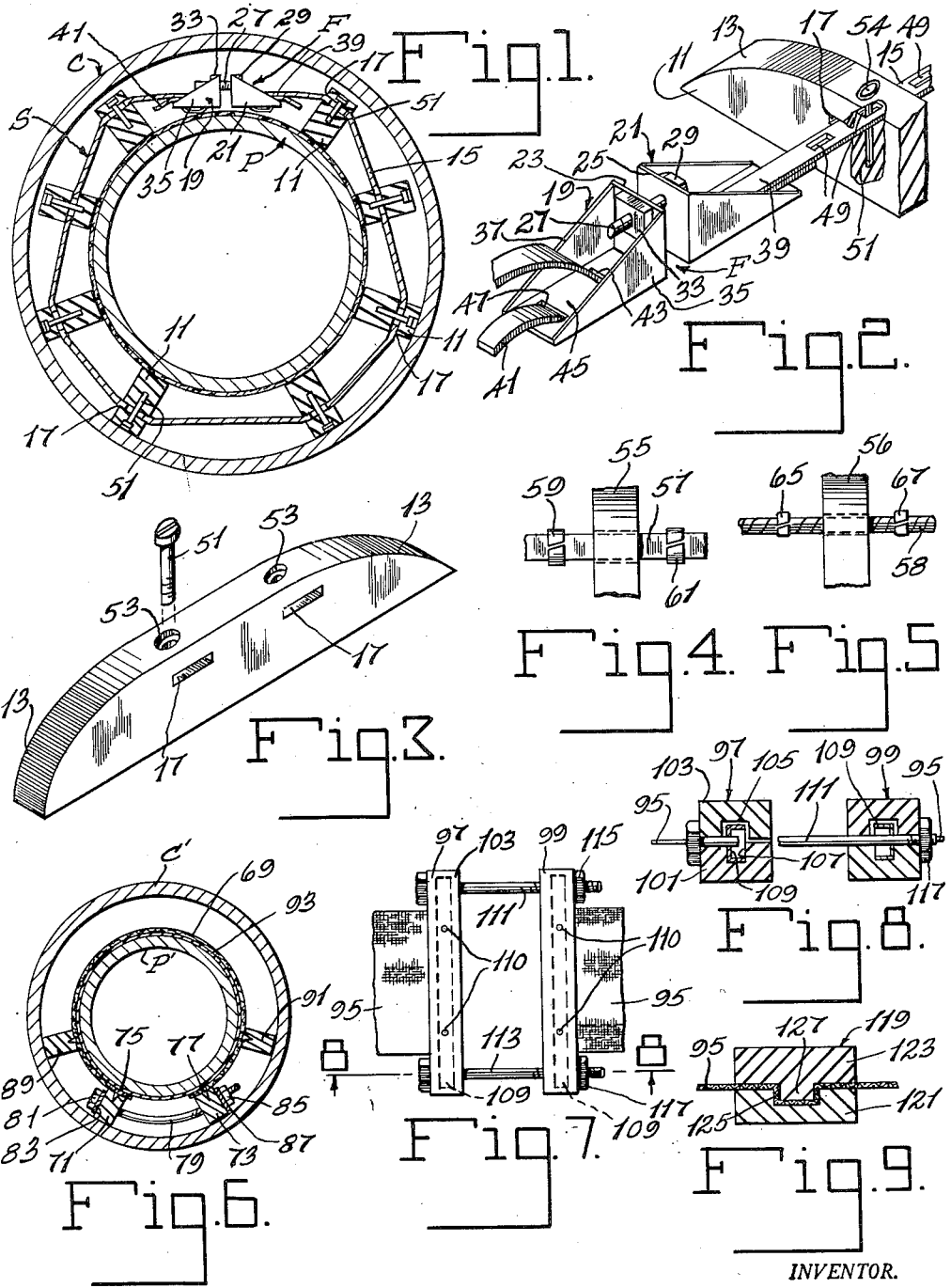
INVENTOR.
BY

2,782,804

PIPE SPACING DEVICE

Donald H. Bond, Houston, Tex., assignor, by mesne assignments, to The Texas Pipe Line Company, Houston, Tex., a corporation of Texas Application May 27, 1953, Serial No. 357,719

12 Claims. (Cl. 138—65)

This invention relates to a novel pipe spacing device of the type which is fitted around an internal pipe to space it within a surrounding casing. Such casings often are used for protecting oil or gas pipe lines where they pass under a railroad embankment or similar weighty obstruction. An important function of a pipe spacing device is to insulate the internal pipe electrically from the surrounding casing so as to reduce electrolytic corrosion and to reduce the power requirements when cathodic protection is applied to the pipe line. Consequently, pipe spacing devices are usually constructed of materials which have good electrically insulating properties, and which have low moisture absorption characteristics. Among materials which can be used successfully are hard rubber and phenolic condensation products such as Bakelite type resins.

One type of pipe spacing device which has been used successfully is shown in my U. S. Patent Re. 23,545, dated September 9, 1952. A plurality of blocks of electrically insulating material are located at circumferentially spaced points around the outside of a pipe, and are secured together and held firmly on the pipe by a pair of connectors such as cables or bars which pass through the several blocks and are tensioned by bolt and nut connections.

I have found that while such pipe spacing and insulating devices are generally satisfactory, they may suffer from certain disadvantages. Time consuming and laborious operations are required for tightening the device on the outside of a pipe. Furthermore, each pipe spacing device must be made for a pipe of a specific diameter, with only a very small tolerance in diameter being allowable. Also, in order to prevent twisting of the pipe spacing blocks on a pipe as the latter is inserted into a casing, it heretofore has been necessary to use two longitudinally spaced connectors, whereas a single connector otherwise would suffice.

Additionally, when pipe spacing devices are secured tightly around a pipe there is sometimes a tendency for the connector cable or strap to tilt the blocks so that they rest insecurely upon the pipe surface and also displace any corrosion resistant coating that may be on the pipe. Furthermore, in the past it has usually been necessary to employ metal connector cables or straps to secure the spacer blocks together, whereas non-metallic materials such as nylon or fiberglass present definite advantages because of their relative cheapness and their good insulating properties.

In accordance with the present invention there is provided a novel pipe spacing device which is adapted to be secured more rapidly and easily around the outside of a pipe than was possible heretofore, and which can be applied to pipes having a wide variety of diameters. My novel device also is so designed that but a single connector may be employed; that the pipe spacer blocks can be installed without being tilted upon the pipe surface; and that non-metallic connector means can be employed if desired. Furthermore, my improved devices are simple and inexpensive in construction, can be applied to a pipe rapidly and easily, and have good resistance to deterioration when in service.

The invention will be described in detail below with reference to the drawings, in which:

Figure 1 is a cross-sectional view showing my novel pipe spacing device secured to an internal pipe which is located within an external casing;

Figure 2 is an enlarged perspective view showing a part in the pipe spacing device of Figure 1;

Figure 3 is a perspective view of one of the pipe spacer blocks of Figure 1;

Figures 4 and 5 are fragmentary plan views showing modified constructions for securing a pipe spacer block on a connector;

Figure 6 is a cross-sectional view showing another embodiment of my novel pipe spacing device;

Figure 7 is a fragmentary plan view showing a modified coupling construction for securing a pipe spacing device around a pipe, this construction being especially adapted for use with a non-metallic connector strap;

Figure 8 is a cross-sectional view taken along the line 8—8 in Figure 7; and

Figure 9 is a cross-sectional view showing how a pipe spacer block is secured to a wide connector strap of the type shown in Figure 7.

Referring to Figures 1–3 of the drawings, there is shown an internal pipe P spaced within an external casing C by a pipe spacing device S comprising a string of circumferentially spaced longitudinally extending parallel blocks or bars 11, which advantageously are constructed of an electrically insulating and moisture resistant material. Blocks 11 are long and narrow with rectangular cross-sections, and have tapered ends 13 to facilitate insertion into a casing. Also, those near the top of the pipe are thinner than those at the bottom to assure adequate clearance during insertion.

All of the spacer blocks 11 are connected together by one or more circumferentially extending corrosion resistant connector elements, such as a continuous wide thin flexible strap 15 of galvanized or stainless steel which pass transversely through correspondingly shaped wide thin apertures such as the slots 17 in the several spacer blocks, the fit being tight enough to prevent sideways twisting of the blocks on the strap. When two or more connector straps 15 are employed, the blocks are then provided with a corresponding number of longitudinally spaced apertures 17 to receive the straps. When a single wide strap is used, each block 11 has a single correspondingly wide slot which advantageously is about half as wide as the block is long, for example being about three inches wide for a block seven inches long.

The ends of the pipe spacing device S are secured together by a coupling F at the top of the pipe P, for fastening and tensioning the connector 15 on the pipe. As shown in Figure 2 the coupling F comprises a pair of spaced opposed coupling members such as brackets 19 and 21 secured on the ends of connector strap 15 and having parallel upstanding flanges 23 and 25 through which passes a coupling bolt 27. Bolt 27 has at one end, a head 29 bearing against flange 25, and on the other end has adjustably threaded thereon a square nut 33 which fits snugly between a pair of side walls 35 and 37 of the bracket 19 and bears against flange 23. Bolt head 29 has wrench flats, and also a screw driver slot for rapid tightening.

The end 39 of strap 15 can be secured to bracket 21 in any desired way, as by welding, clamping, or threading it in slots as described below for the other end 41. The other end 41 of the strap is adjustably secured to bracket 19 by passing it down through a lateral slot 43 in a base plate 45 and then up through a second parallel slot 47 so that the end of the strap is turned back upon itself. With this construction a pipe spacing device of a single size can be adapted to fit a wide variety of pipe sizes.

The several spacer blocks 11 are secured on the connector 15 in such a way that limited movement of the blocks lengthwise of the connector is possible as the coupling F is tightened. Figures 1–3 show that the connector 15 is a wide strap provided with longitudinally extending narrow slots 49 which loosely receive a fastening pin 51 extending in from the top of each block so that the pin can move in the slot. Slots 49 may be longer near the top of the pipe where the greatest movement may occur. During installation the pins 51 should be near or against the ends of the several slots closest to coupling F. To preserve the electrically insulating qualities of the pipe spacing device the head of each of the pins 51 advantageously is sunk below the top surface of the block 11 into a counterbore 53, and the head of the pin is then covered with a suitable electrically insulating material such as rubber or plastic at 54. When one of the spacer blocks is located centrally on the connector 15, it may be secured rigidly thereto since force is exerted thereon equally in both directions when installing the spacer device around a pipe. A similar result can be obtained by wedging the blocks to the connector, as by bowed leaf springs molded in the block apertures, which hold the blocks in proper position but permit movement of the connector during installation.

Figures 4 and 5 show a modified construction for securing spacer blocks 55 and 56 on a connector element such as a strap 57 or a cable 58, respectively. As shown in Figure 4 two projections such as split metal rings 59 and 61 are crimped or otherwise secured to the strap 51 on opposite sides of the block 55, and are spaced apart by a distance greater than the thickness of the block so that the latter is captured, but the strap can move lengthwise through the block a limited distance. Split rings 65 and 67 are similarly mounted on the cable 58 in Figure 5.

In another embodiment of a pipe spacing device embodying the principles of the invention, as shown in Figure 6, a connector strap 69 has a pair of circumferentially separated pipe spacer blocks 71 and 73 secured on its outer side at its opposite ends by screws 75 and 77 which pass through the strap from its inner side into the blocks. Long blocks require a series of such screws. The device is held tightly around a pipe P' by a bolt 79 extending laterally through the blocks and curved to avoid contact with the pipe. Bolt 79 has a head 81 bearing against a metal side plate 83 on one side of the block 71, and carries an adjustable nut 85 which bears against a second metal side plate 87 on the opposite side of the second block 73. Blocks 71 and 73 desirably are constructed of non-metallic material having high dielectric strength, such as rubber or a resin.

For small pipes two spacer blocks 71 and 73 at the bottom of the pipe are adequate to support the pipe within a casing C'. For larger pipes it is sometimes advantageous to employ additional bracing spacer blocks 89 and 91 which also are secured by screws to the strap 79. All spacer blocks in this modification are located below the horizontal diameter of the pipe P' to make easy the insertion of the pipe within the casing. If desired, a layer of insulating material such as a rubber sheet 93 can be inserted between pipe P' and strap 69. This construction is especially suitable where the clearance between pipe and casing is small, say less than 1¾ inches.

In Figures 7 and 8 there is shown a novel coupling for a pipe spacing device which employs a flexible wide strap 95 constructed of a non-metallic material such as woven, spun, or extruded nylon or resin-bonded fiber-glass. Such non-metallic material have both sufficient strength to hold the spacer blocks in place during installation of a pipe within a casing, and great resistance to rotting under conditions existing within a casing. The ends of the strap 95 are fitted with a pair of spacer blocks 97 and 99, each of which comprises a pair of sections 101 and 103 located on opposite sides of the strap 95 and firmly secured thereto.

In the specific embodiment illustrated, each of the block sections 101 and 103 comprises a relatively weak non-metallic material and has mating grooves 105 and 107 therein. A longitudinally extending relatively strong metallic reinforcing bar 109 fits snugly within both grooves 105 and 107 for holding the flexible strap 95 firmly in place within groove 105 when the two sections are secured together on the strap. Suitable adhesive material such as glue or cement, either air setting or thermosetting, is employed within the grooves 105 and 107 and between the strap 95 and the surfaces of blocks 97 and 99. Countersunk screws 110 pass through holes in bar 109 and into section 103 to hold the assembly together while the adhesive sets.

Blocks 97 and 99 and their contained reinforcing bars 109 project laterally beyond both edges of strap 95, and the projecting portions carry coupling bolts 111 and 113 which extend through the two blocks and their reinforcing bars in the plane of the strap. Nuts 115 and 117 threaded on the ends of the bolts can be adjusted to bring the blocks 97 and 99 closer together and tighten the strap 95 around a pipe.

Figure 9 shows how strap 95 can be provided with additional spacing blocks around its circumference, as needed. Spacer block 119 comprises a pair of block sections 121 and 123 having a groove 125 and a mating tongue 127, respectively, extending laterally across strap 95. Strap 95 is compressed into groove 125 by tongue 127, and the two block sections are held together and to the strap by glue or other suitable adhesive material.

Obviously many modifications and variations of the invention, as hereinbefore set forth, may be made without departing from the spirit and scope thereof, and therefore only such limitations should be imposed as are indicated in the appended claims.

I claim:

1. A pipe spacing device adapted to be secured around the outer surface of a pipe, comprising a plurality of blocks spaced from one another; connector means connecting said blocks together in a string; said blocks being mounted on said connector means for movement lengthwise thereof; fastening means coacting with said blocks and said connector means holding said blocks on said connector means and limiting the extent of movement thereof to a short distance sufficient to counteract the tendency for said blocks to tilt during application to a pipe; and coupling means for coupling together the ends of said string to secure said device around a pipe.

2. A pipe spacing device in accordance with claim 1 wherein said blocks have apertures therethrough, wherein said connector means passes through said apertures and wherein said blocks are freely slidable on said connector means within limits imposed by said fastening means.

3. A pipe spacing device in accordance with claim 1 wherein said blocks have apertures therethrough, said connector means is an element passing through said apertures, and said fastening means comprises a pair of projections carried by said element and located on opposite sides of a block to capture said block on said element, said projections being spaced apart by a distance greater than the thickness of said block to permit limited movement of said element through said block.

4. A pipe spacing device in accordance with claim 3, wherein said projections are rings secured to said element.

5. A pipe spacing device adapted to be secured around the outer surface of a pipe, comprising a plurality of blocks spaced from one another; connector means for connecting said blocks together in a string, said connector means comprising at least one continuous member having a plurality of longitudinally spaced slots therein; fastening means fastening said blocks to said connector means and so constructed and arranged as to permit limited movement of said blocks lengthwise on said connector means, said fastening means comprising a plurality of pins extending through said slots and into said blocks, said pins being movable in said slots; and coupling means for coupling together the ends of said string to secure said device around a pipe.

6. A pipe spacing device in accordance with claim 5, wherein said blocks have apertures therethrough, wherein said connector means is a strap passing continuously through said apertures, and wherein said pins extend from the outside surfaces of said blocks through said apertures and slots.

7. A pipe spacing device in accordance with claim 5, wherein said connector means is a strap; and wherein said coupling means comprises a pair of coupling members engaging opposite ends of said strap, and a device engaging both of said coupling members and operable to move said coupling members toward one another, at least one of said coupling members including a plate provided with a pair of spaced parallel slots for adjustably receiving an end of said strap turned back upon itself.

8. A pipe spacing device adapted to be secured around the outer surface of a pipe, comprising a strap of flexible material adapted to encircle such a pipe, said strap having opposite ends; coupling means coupling said ends together; and spacer block means carried by said strap, said spacer block means including a pair of spacer block sections on opposite sides of said strap engaging said strap therebetween, and means connecting said spacer block sections to said strap and to each other.

9. A pipe spacing device in accordance with claim 8, wherein one of said block sections has a groove and the other a mating tongue extending laterally of said strap, said strap being compressed into said groove by said tongue, said block sections being held together and to said strap by adhesive material.

10. A pipe spacing device in accordance with claim 8, wherein said strap is made of non-metallic material.

11. A pipe spacing device in accordance with claim 8, wherein said spacer block means comprises a pair of spacer blocks on said opposite ends extending laterally beyond the edges of said strap, and wherein said coupling means comprises a pair of devices located beyond said edges and adapted for connecting together said spacer blocks, said devices being adjustable to draw said spacer blocks together to tighten said strap on a pipe.

12. A pipe spacing device in accordance with claim 11, wherein said spacer block sections comprise non-metallic material and have mating laterally extending grooves therein, wherein said spacer block means also comprise a pair of metal bars fitting within said mating grooves, wherein said strap is compressed into said grooves by said bars, and wherein said coupling means comprises tensioning members extending transversely through said spacer blocks including said metal bars.

References Cited in the file of this patent

UNITED STATES PATENTS

| Re. 23,545 | Bond | Sept. 9, 1952 |
| 1,122,130 | Lamson | Dec. 22, 1914 |
| 1,199,826 | Schroeder | Oct. 3, 1916 |
| 2,553,390 | Streyckmans | May 15, 1951 |
| 2,561,845 | Curry | July 24, 1951 |
| 2,706,495 | Risley | Apr. 19, 1955 |

FOREIGN PATENTS

| 607,329 | France | June 30, 1926 |